(12) United States Patent
Clos

(10) Patent No.: US 9,403,595 B1
(45) Date of Patent: Aug. 2, 2016

(54) CARGO POWER DRIVE UNIT WITH WATER EXTRACTION MECHANISM

(71) Applicant: The Boeing Company, Chicago, IL (US)

(72) Inventor: William R. Clos, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/628,364

(22) Filed: Feb. 23, 2015

(51) Int. Cl.
*B65G 13/06* (2006.01)
*B65G 13/11* (2006.01)
*B64D 9/00* (2006.01)

(52) U.S. Cl.
CPC *B64D 9/00* (2013.01); *B65G 13/06* (2013.01); *B65G 13/11* (2013.01); *B64D 2009/006* (2013.01)

(58) Field of Classification Search
CPC .......... B65G 13/06; B65G 13/11; B64D 9/00; B64D 2009/006
USPC ..................... 198/789–791; 193/37
See application file for complete search history.

(56) References Cited

U.S. PATENT DOCUMENTS

| 4,860,875 A * | 8/1989 | Couwenbergs | B65G 13/11 104/135 |
| 5,033,601 A * | 7/1991 | Huber | F16C 29/046 193/35 MD |
| 5,351,808 A * | 10/1994 | Sundseth | B64D 9/00 198/722 |
| 6,051,133 A * | 4/2000 | Huber | B64D 9/00 198/788 |
| 6,129,195 A * | 10/2000 | Matheny | B65G 39/025 193/35 A |
| 6,517,028 B2 * | 2/2003 | Huber | B64D 9/00 244/118.1 |
| 2004/0218989 A1 * | 11/2004 | Huber | B64D 9/00 410/92 |
| 2007/0095978 A1 * | 5/2007 | Oetken | B64C 1/20 244/118.1 |
| 2012/0119027 A1 * | 5/2012 | Huber | B64C 1/18 244/118.1 |
| 2014/0326574 A1 * | 11/2014 | Kalitta | B65G 39/12 193/35 MD |

* cited by examiner

*Primary Examiner* — Mark A Deuble
(74) *Attorney, Agent, or Firm* — Baldauff IP, LLC; Michael J. Baldauff, Jr.

(57) ABSTRACT

Apparatus and methods provide for a cargo power drive unit (PDU) with a water extraction mechanism. According to one aspect, a PDU includes a PDU housing that is configured for installation within the cargo floor. A PDU drive wheel is positioned within a drive wheel compartment of the PDU housing. A water barrier is positioned around a top portion of the PDU housing. A water extraction mechanism is configured to transfer water from a sump portion of the drive wheel compartment to the cargo floor outside of the water barrier.

20 Claims, 6 Drawing Sheets

CARGO POWER DRIVE UNIT WITH WATER EXTRACTION MECHANISM

BACKGROUND

Cargo aircraft commonly include cargo floors that have a number of incorporated rollers that facilitate the movement and manipulation of cargo loaded onto pallets. There may also be a number of power drive units (PDUs) mounted within the cargo floors. A conventional PDU includes an actuator-driven drive wheel that is sized to engage a bottom surface of a pallet when positioned on the rollers. When activated, the drive wheels of the PDUs rotate, moving the cargo pallets forward or rearward along the cargo floor over the rollers, which freely rotate.

When cargo and the associated pallets are wet due to rain or snow, the water falls onto the cargo floor. Cargo floors include drains for effective water removal, however, the water flowing to the floor drains often falls around the drive wheels into the drive wheel compartments of the PDUs. Water within the PDUs is undesirable since wet drive wheels may slip when engaging pallets, decreasing the efficiency of the pallet loading or unloading operation. To combat this issue, conventional PDUs include a drain that allows the water within the drive wheel compartments to be routed to a system of drain tubes connecting the PDUs to a holding tank from which the water may be removed or disposed of. This system of drain tubes adds significant weight and expense to the aircraft.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a cargo power drive unit with a water extraction mechanism. According to one aspect, a PDU for moving pallets over a cargo floor in a wet environment is provided. The PDU may include a PDU housing that is configured for installation within the cargo floor. A PDU drive wheel is positioned within a drive wheel compartment of the PDU housing. The PDU drive wheel extends a height H above the cargo floor. A water barrier is positioned around a top portion of the PDU housing, extending a distance less than the height H. A water extraction mechanism is configured to transfer water from a sump portion of the drive wheel compartment to the cargo floor outside of the water barrier.

According to another aspect, a method for moving pallets over a cargo floor in a wet environment is provided. According to the method, a PDU drive wheel is activated within a drive wheel compartment of a PDU housing. A bottom surface of a pallet is engaged with the PDU drive wheel to move the pallet. Water is routed around the drive wheel compartment with a water barrier positioned around a top portion of the PDU housing. Water is transferred from a sump portion of the drive wheel compartment to the cargo floor outside of the water barrier via a water extraction mechanism.

According to yet another aspect, a PDU for moving pallets over a cargo floor in a wet environment includes a PDU housing configured for removable installation within the cargo floor. A PDU drive wheel is positioned within a drive wheel compartment of the PDU housing. The PDU drive wheel extends a height H above the cargo floor. A motor is positioned within the PDU housing and operates to rotate the PDU drive wheel. A water barrier is positioned around a top portion of the PDU housing and extends a distance less than the height H above the cargo floor. A water conduit is positioned within the PDU housing, providing a conduit from a sump portion of the drive wheel compartment to an exterior side of the water barrier. A pump is positioned within the PDU housing and is operative to pump water from the sump portion of the housing through the water conduit to the cargo floor on the exterior side of the water barrier.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
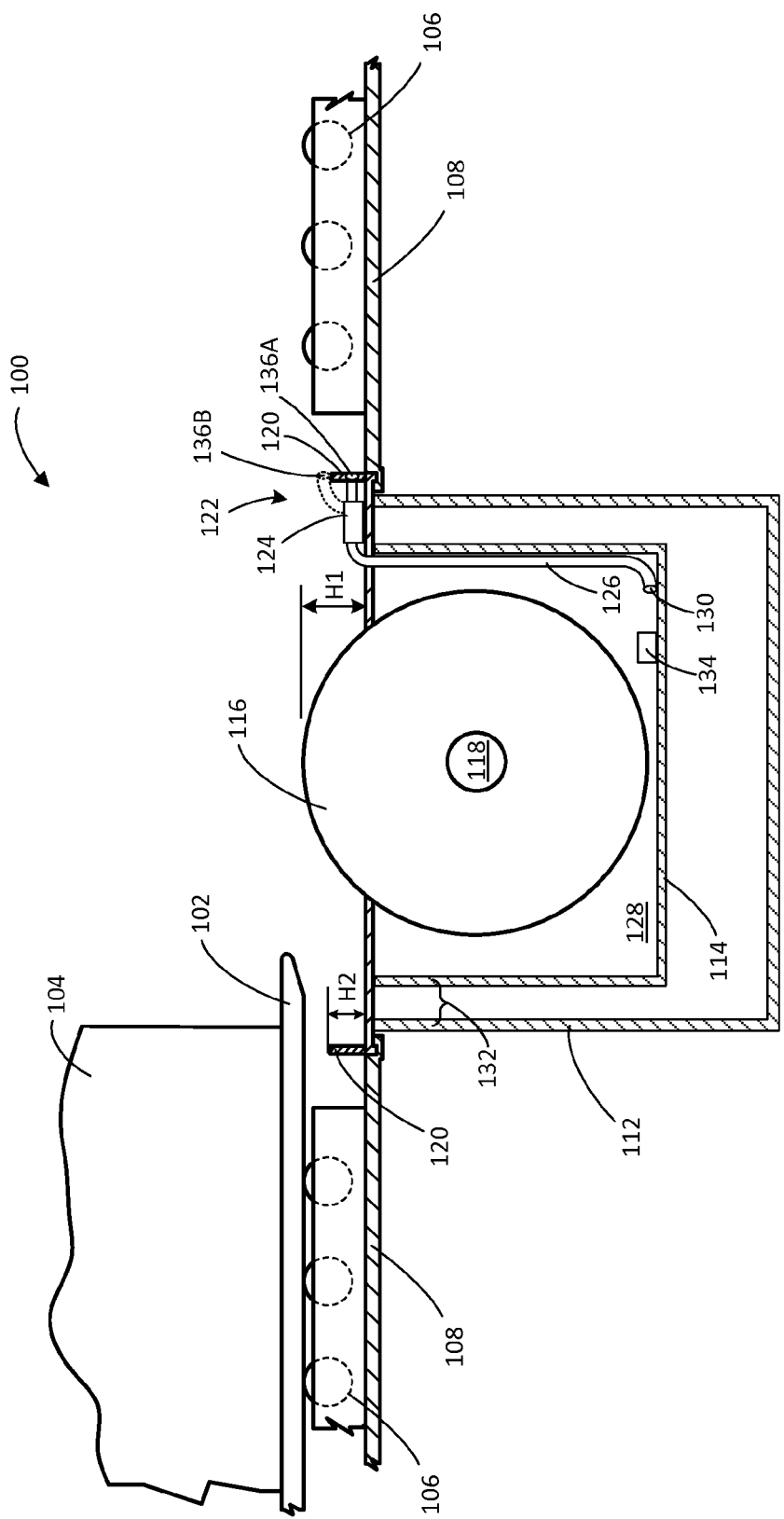
FIG. 1 is a side view and cross-sectional view of a PDU for moving pallets over a cargo floor in a wet environment, illustrating a water barrier positioned around an outer edge of a PDU housing according to various embodiments described herein.

The following detailed description is directed to a cargo power drive unit with a water extraction mechanism and corresponding method that utilizes a water barrier for routing water around a PDU drive wheel, and a water extraction mechanism for transferring water from a drive wheel compartment to the cargo floor external to the water barrier. As discussed above, traditional PDUs include a water drain that is connected to a system of pipes or tubes that carry the water from all PDUs to one or more collection tanks. This plumbing adds a significant amount of weight to the aircraft along with the associated cost of the plumbing and associated hardware.

Utilizing the concepts and technologies described herein, water from cargo and pallets is routed around the PDUs using water barriers. Any water that enters the drive wheel compartments is pumped out of the compartment to the cargo floor, where the water is routed to the existing cargo floor drains. In doing so, all of the conventional drains associated with PDUs, as well as the associated holding tanks, may be eliminated, saving the corresponding weight and cost of the drain components. Various embodiments will be described in which a water barrier is used to route water from the cargo floor around a PDU, or around the drive wheel compartment of a PDU. A water extraction mechanism associated with each PDU is used to pump water out and back onto the cargo floor. Various implementations of the water extraction mechanism will be described in which some or all of the components of the water extraction mechanism may be located within the drive wheel compartment, external to the drive wheel compartment but within the PDU housing, and/or on top of the PDU housing. Moreover, according to various embodiments described below, the water extraction mechanism and water barrier may be an integral part of a PDU, or may be attachable to a PDU, which allows for use with existing conventional PDUs.

In the following detailed description, references are made to the accompanying drawings that form a part hereof, and which are shown by way of illustration, specific embodiments, or examples. Referring now to the drawings, in which like numerals represent like elements through the several figures, a cargo power drive unit with a water extraction mechanism and method for employing the same according to the various embodiments will be described.

FIG. 1 shows a side view and cross-sectional view of a PDU 100 for moving pallets 102 over a cargo floor 108 in a wet environment, illustrating a water barrier 120 positioned around an outer edge of a PDU housing 112 according to various embodiments described herein. Looking at FIG. 1, an example environment is shown according to various embodiments in which cargo 104 on a pallet 102 is being moved across a cargo floor 108 on rollers 106. To assist in moving the cargo 104 over the rollers 106, a PDU 100 is used. The PDU 100 includes a PDU housing 112 installed within the cargo floor 108. The PDU housing 112 encompasses a drive wheel compartment 114, which houses a PDU drive wheel 116. The PDU drive wheel 116 is rotated using a motor 118. The motor 118 is operatively coupled to the PDU drive wheel 116, and configured to rotate the PDU drive wheel 116 in a manner known by those with skill in the art.

The PDU drive wheel 116 is positioned within the drive wheel compartment 114 of the PDU housing 112 and extends a height H1 above the cargo floor 108. The height H1 corresponds to the height of the bottom of the pallet 102 as the pallet 102 sits on the rollers 106. As the pallet 102 slides over the top of the PDU drive wheel 116, the PDU drive wheel 116 frictionally engages the pallet 102 to drive the pallet 102 and corresponding cargo 104 over the PDU 100 to adjacent rollers 106 and the next PDU 100.

Figure 2:
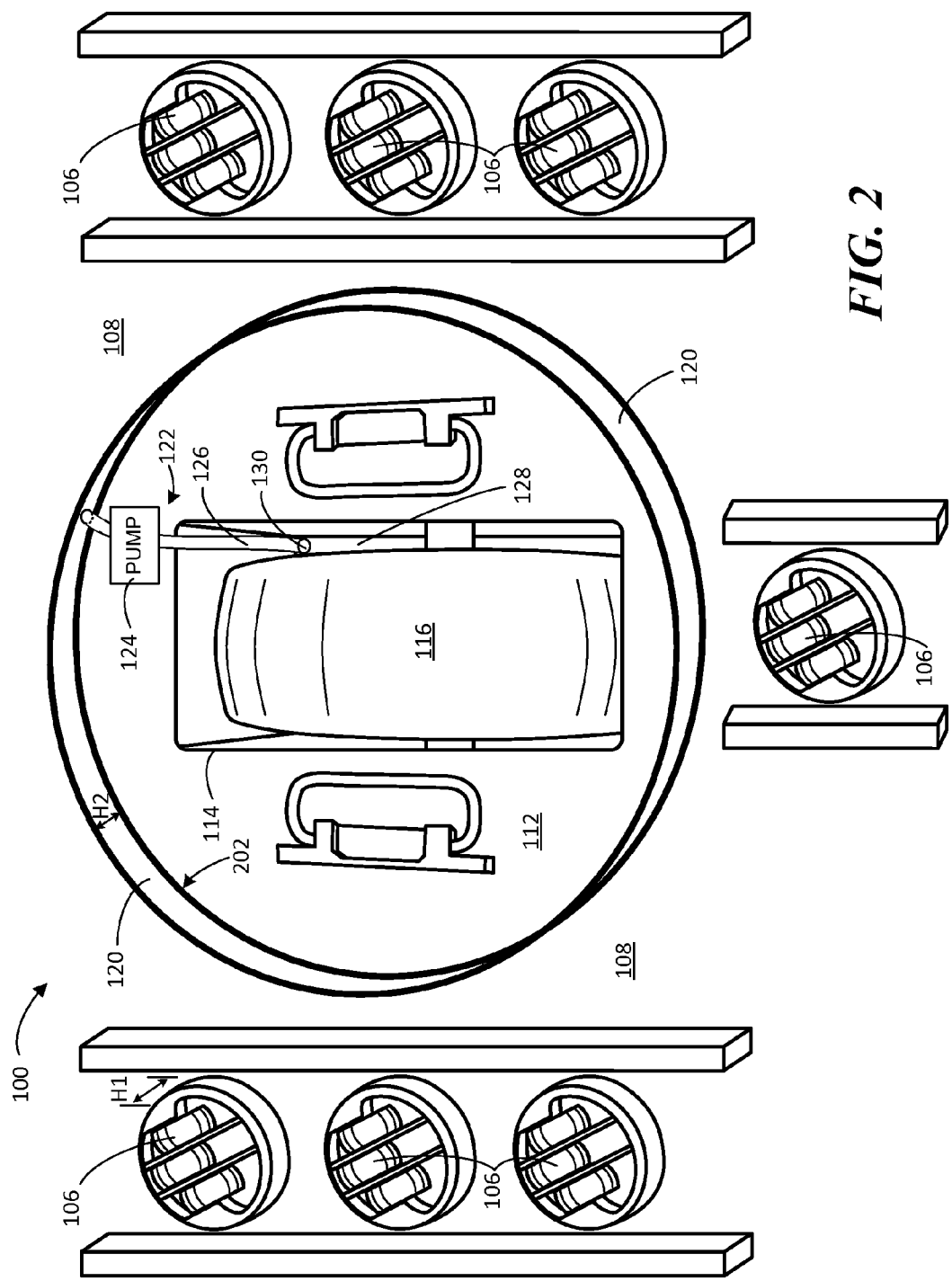
FIG. 2 is a perspective top view of a PDU for moving pallets over a cargo floor in a wet environment, illustrating a water barrier positioned around an outer edge of a PDU housing according to various embodiments described herein.
Figure 3:
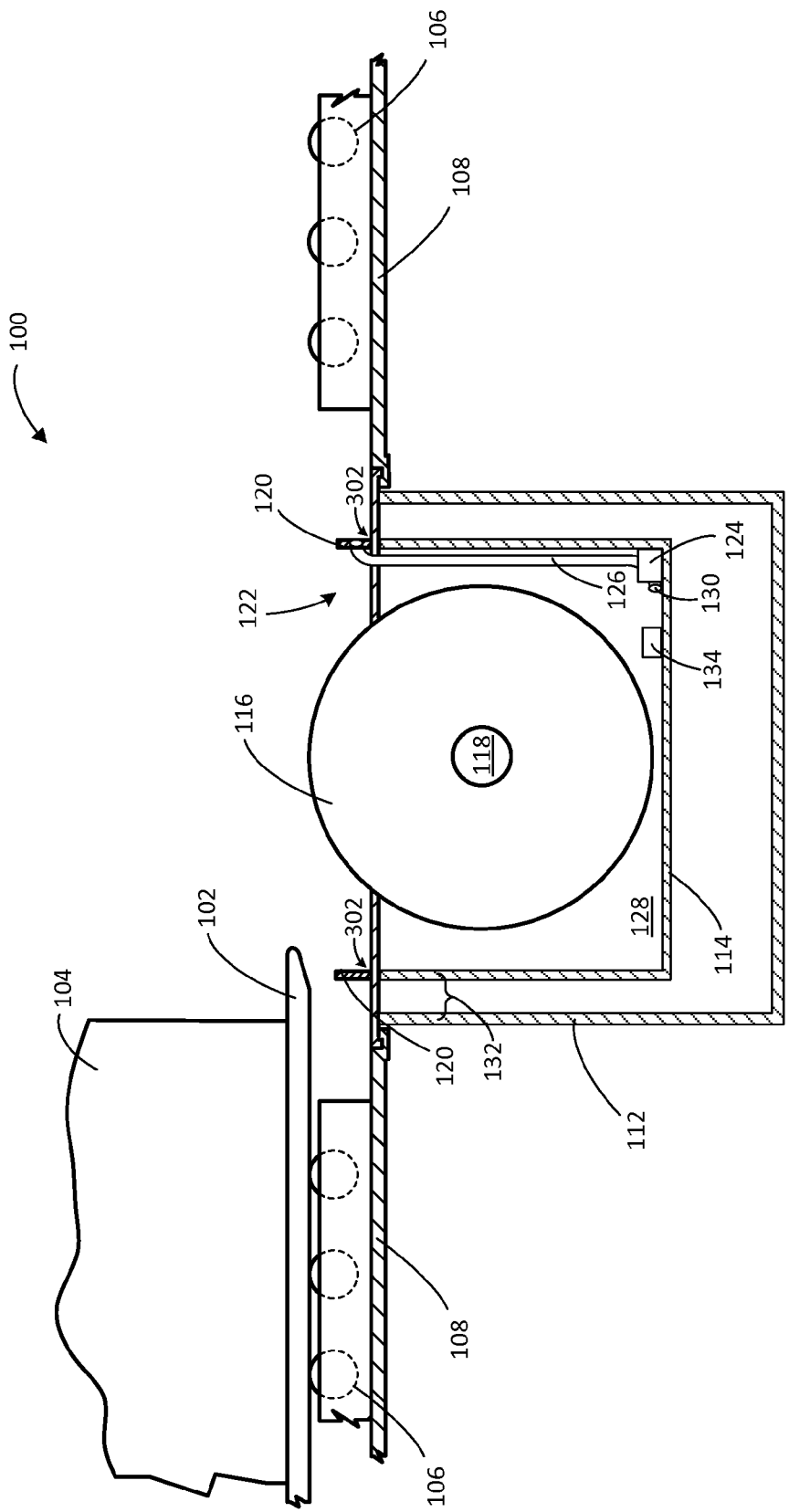
FIG. 3 is a side view and cross-sectional view of a PDU for moving pallets over a cargo floor in a wet environment, illustrating a water barrier positioned around a perimeter of a drive wheel compartment of the PDU housing with a water extraction mechanism positioned within the drive wheel compartment according to various embodiments described herein.
Figure 4:
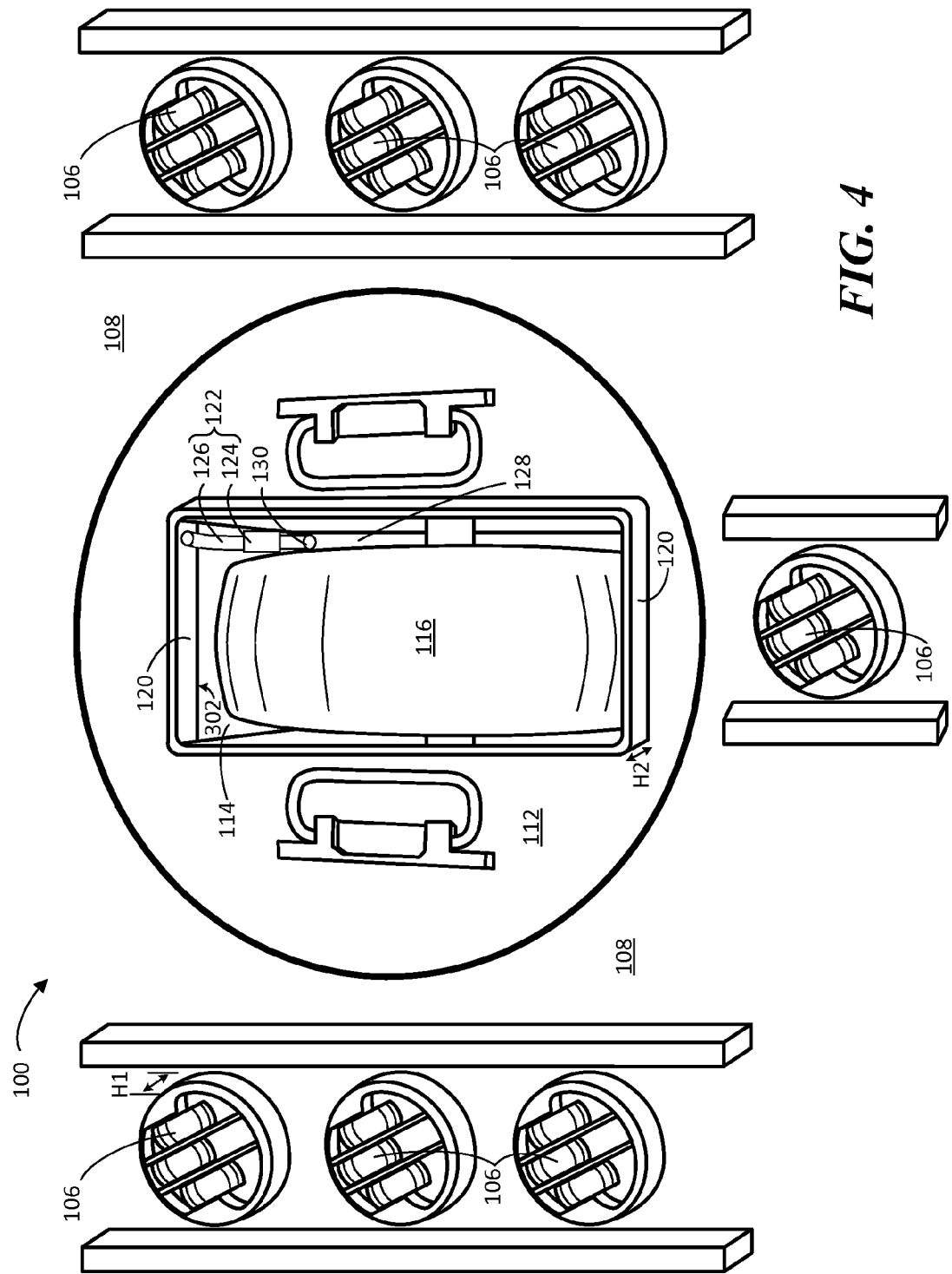
FIG. 4 is perspective top view of a PDU for moving pallets over a cargo floor in a wet environment, illustrating a water barrier positioned around a perimeter of a drive wheel compartment of the PDU housing according to various embodiments described herein.
Figure 5:
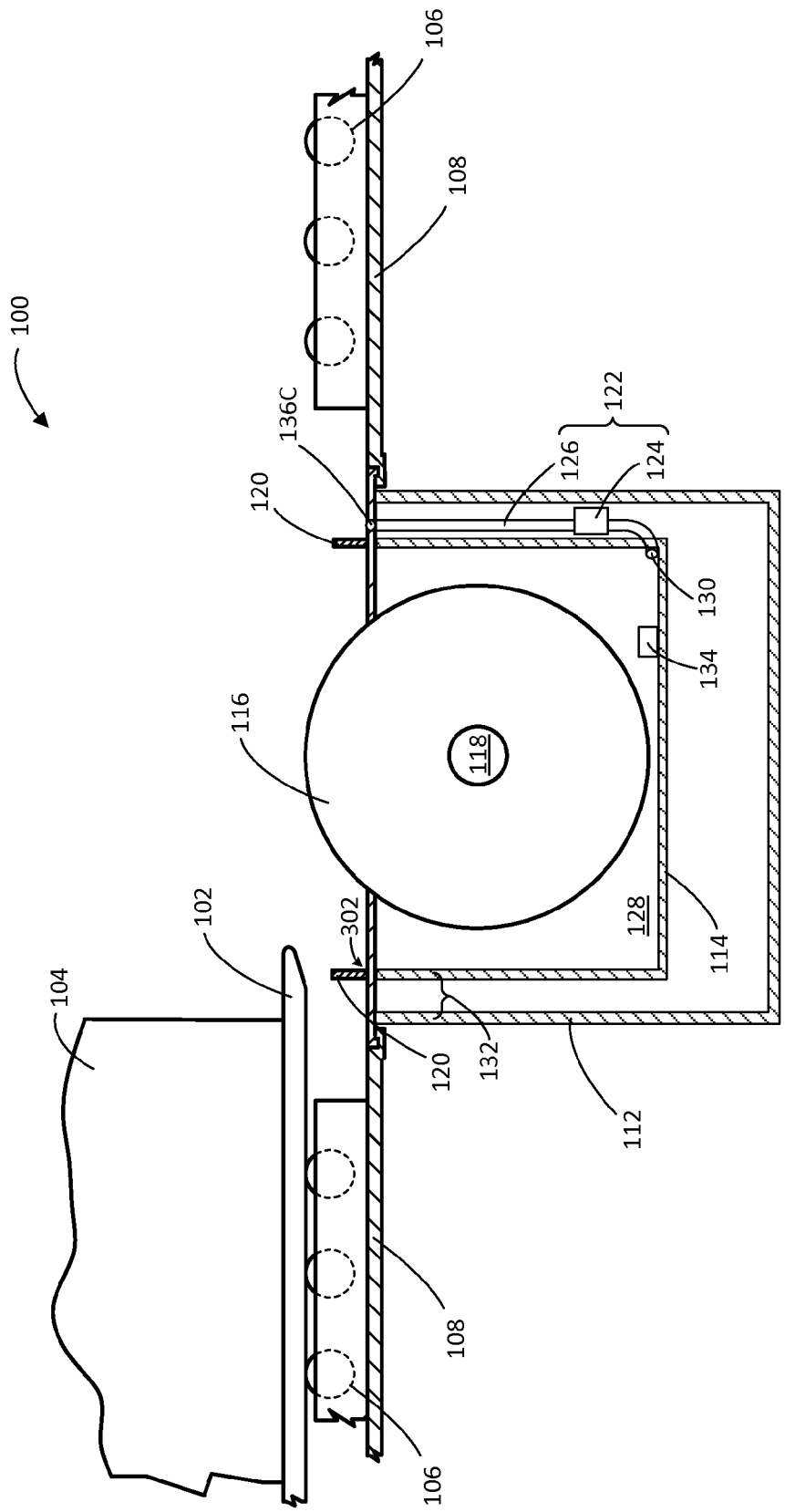
FIG. 5 is a side view and cross-sectional view of a PDU for moving pallets over a cargo floor in a wet environment, illustrating a water barrier positioned around a perimeter of a drive wheel compartment of the PDU housing with a water extraction mechanism positioned outside of the drive wheel compartment according to various embodiments described herein.

According to various embodiments, the PDU 100 includes a water barrier 120 that prevents water from flowing into the drive wheel compartment 114 by routing the water around the PDU 100. The water barrier 120 is positioned around a top portion 132 of the PDU housing 112 and extends a height H2 above the cargo floor 108. The top portion 132 of the PDU housing 112 may include the outer edge 202 of the PDU housing 112, as shown in FIGS. 1 and 2. Alternatively, the top portion 132 of the PDU housing 112 may include the outer edge 302 of the drive wheel compartment 114, as shown in FIGS. 3-5.

The height H2 of the water barrier 120 is less than the height H1 of the PDU drive wheel 116, as well as of the rollers 106, so that the water barrier 120 does not interfere with the movement of the pallet 102. The height H1 of the rollers 106 and the PDU drive wheel 116 is approximately equivalent since both contact the bottom surface of the pallet 102 to assist in moving the pallet 102 along the cargo floor 108.

The water barrier 120 may be manufactured from a metallic or non-metallic material such as aluminum, fiberglass, plastic, rubber, or other suitable material. According to one embodiment, the water barrier 120 may be manufactured from a flexible material so that it may be placed in any desired configuration around the top portion 132 of the PDU housing 112. For example, it may be desirable to bend or turn the water barrier 120 around a roller 106 or other obstruction on the cargo floor 108 in a specific location, where the bed or turn may not be needed or desirable in another location for another PDU within the cargo floor 108. The water barrier 120 may be fixedly or removably attached to the top portion 132 of the PDU housing 112. For example, the water barrier 120 may be welded in place, attached via fasteners or adhesive, or may be press fit into a gap between the PDU 100 and the cargo floor 108. Alternatively, the water barrier 120 may be attached using magnets, clips, snaps, tape, hook and loop fasteners, or any other suitable fasteners.

The PDU 100 includes a water extraction mechanism 122 configured to transfer water from a sump portion 128 of the drive wheel compartment 114 to the cargo floor 108 outside of the water barrier 120 via PDU water outlet 136A or 136B (generally referred to as PDU water outlet 136). The water extraction mechanism 122 may include a pump 124 and a water conduit 126. The water conduit 126 fluidly couples the sump portion 128 of the drive wheel compartment 114 to an exterior side of the water barrier 120 so that water from the sump portion 128 may be transferred to the cargo floor 108 outside of the PDU 100. The pump 124 is fluidly coupled to the water conduit and is operative to pump the water from the sump portion 128 to the cargo floor 108 via the PDU water outlet 136. According to one embodiment, the water conduit 126 exits the water barrier 120 somewhere between a top edge and a bottom edge of the water barrier 120. This creates the PDU water outlet 136A shown in solid black lines within the water barrier 120. According to an alternative embodiment, the water conduit 126 may extend over a top edge of the water barrier 120 to deposit the water over the barrier to the cargo floor 108. This embodiment is shown in broken lines with PDU water outlet 136B. According to a third alternative shown in FIG. 5, the water conduit 126 may exit the PDU housing 112 at PDU water outlet 136C at a position external to the water barrier 120.

Looking at FIGS. 1 and 2, the water conduit 126 is positioned to provide a single water outlet 130 for the sump portion 128 of the drive wheel compartment 114. Water is only transferred from the sump portion 128 via the single water outlet 130, which is fluidly coupled to the water conduit 126 of the water extraction mechanism 122. In other words, the single water outlet 130 of the sump portion 128 defines a water inlet to the water conduit 126. There is no drain from the drive wheel compartment 114 to a pipe or tubing that connects the PDU to an external system of drain pipes, as is done with conventional PDUs. Rather, the water removal components are self-contained within the PDU 100.

According to the example shown in FIGS. 1 and 2, the water conduit 126 is positioned within the drive wheel compartment 114, while the pump 124 is positioned on top of the PDU housing 112. It should be understood that this configuration of the water extraction mechanism 122 may be altered as desired per known plumbing techniques. For example, as shown in FIGS. 3 and 4, the pump 124 may be located within the drive wheel compartment 114, and as shown in FIG. 5, the pump 124 and water conduit 126 may be positioned outside of the drive wheel compartment 114, while remaining within the PDU housing 112. These alternate configurations will be described in greater detail below.

If the pump 124 is positioned on top of the PDU housing 112, as shown in FIGS. 1 and 2, the dimensions of the pump 124 should provide for a pump height that is less than H1 so as to not interfere with the pallets 102 passing over the PDU 100. Having the pump 124 positioned on the top of the PDU housing 112 may be beneficial when the water barrier 120 and the water extraction mechanism 122 are configured for attachment to a conventional PDU for reconfiguring the conventional PDU from utilizing the drain and external plumbing described above to the self-contained water removal system of PDU 100 utilizing the concepts described herein. In attaching the water barrier 120 and the water extraction mechanism 122 to the PDU 100, the water conduit 126 is secured using conventional methods to the inside of the drive wheel compartment 114. The water barrier 120 may be positioned around a top portion 132 of the PDU housing 112. The pump 124 is then secured to the top of the PDU housing 112 and electrically and communicatively coupled to an electrical and activation source. The electrical source may include the aircraft wiring, or may include the PDU electrical circuitry, which ultimately is powered by the aircraft. The activation source is the mechanism for activating the pump 124.

There are various methods for activating the pump 124 to transfer water from the sump portion 128 to the cargo floor 108 outside of the water barrier 120. According to one embodiment, the pump 124 may be operatively coupled to a water sensor 134. The pump 124 activates upon detection of water within the sump portion 128 of the drive wheel compartment 114 by the water sensor 134. Alternatively, the pump 124 may activate upon detection by the water sensor 134 of water at a threshold depth, such as a depth that is close to a position that allows contact with the PDU drive wheel 116. These types of water sensors are known in the art. The present disclosure is not limited to any particular type of sensor; including float switches and electrical resistance measurement devices. It should be appreciated that the water sensor 134 is shown as a box positioned on the floor of the drive wheel compartment 114 for simplicity purposes. The water sensor 134 may be positioned at any suitable location without departing from the scope of this disclosure.

According to another method for activating the pump 124, the pump 124 is operatively coupled to the motor 118 such that the pump 124 is activated upon activation of the motor 118. In other words, whenever the PDU drive wheel 116 is rotating, the pump 124 is activated to remove any water from the sump portion 128 of the drive wheel compartment 114. According to yet other embodiments, the pump 124 may operate independently of the motor 118, and be activated in response to a user input or a predetermined schedule. A user may press a button that provides the electrical signal to one or more pumps 124 within PDUs 100 of the cargo floor 108. Alternatively a controller within the PDU 100 may be programmed to activate the pump 124 at a particular time or time interval from a user input or other event.

Turning now to FIGS. 3 and 4, embodiments are shown that illustrate the water barrier 120 being positioned around an outer edge 302 of the drive wheel compartment 114. In these embodiments, the water barrier 120 routes water around the top portion 132 of the PDU 100, just as described above with respect to FIGS. 1 and 2, but only around the drive wheel compartment 114 rather than the entire PDU housing 112. One advantage of this implementation is that less material is needed for the water barrier 120 since it does not extend around the entire perimeter of the PDU 100, which equates to weight and cost savings. An additional aspect of FIGS. 3 and 4 that should be noted includes the pump 124 being located within the sump portion 128 of the drive wheel compartment 114 rather than being positioned on top of the PDU 100. One benefit to this configuration is that by positioning the pump 124 within the drive wheel compartment 114, the pump 124 is protected from damage from external sources within the cargo bay of the aircraft.

While any of the embodiments shown in FIGS. 1-4 may be configured as a single unit with all water extraction and pallet driving components integrated into PDU 100 for removable installation within the cargo floor, the embodiment of FIG. 5 illustrates a good example of a single integrated unit. According to this example, the water extraction mechanism 122 is positioned within the PDU housing 112, but outside of the drive wheel compartment 114. The drive wheel compartment 114 includes a single water outlet 130 that leads to the water conduit 126 outside of the drive wheel compartment 114. The water is pumped up to the PDU water outlet 136C at a position external to the water barrier 120. One benefit to this configuration is that by positioning the water extraction mechanism 122 within the PDU housing 112 but outside of the drive wheel compartment 114, the components of the water extraction mechanism 122 are protected from damage from external sources such as cargo personnel, falling cargo or other objects, or contact with the PDU drive wheel 116.

It should be appreciated that the configurations shown throughout the drawings is for illustrative purposes only and should not be construed as limiting. For example, positioning of the water extraction mechanism 122 may be inside or outside of the drive wheel compartment 114 with the water barrier being positioned around the outer edge 202 of the PDU housing 112 or around the outer edge 302 of the drive wheel compartment 114. The positioning of the water barrier 120 is not dependent on the configuration of the water extraction mechanism 122. Similarly, the activation mechanism used to activate the pump 124 is independent of any configuration of the water barrier 120 and water extraction mechanism 122.

Figure 6:
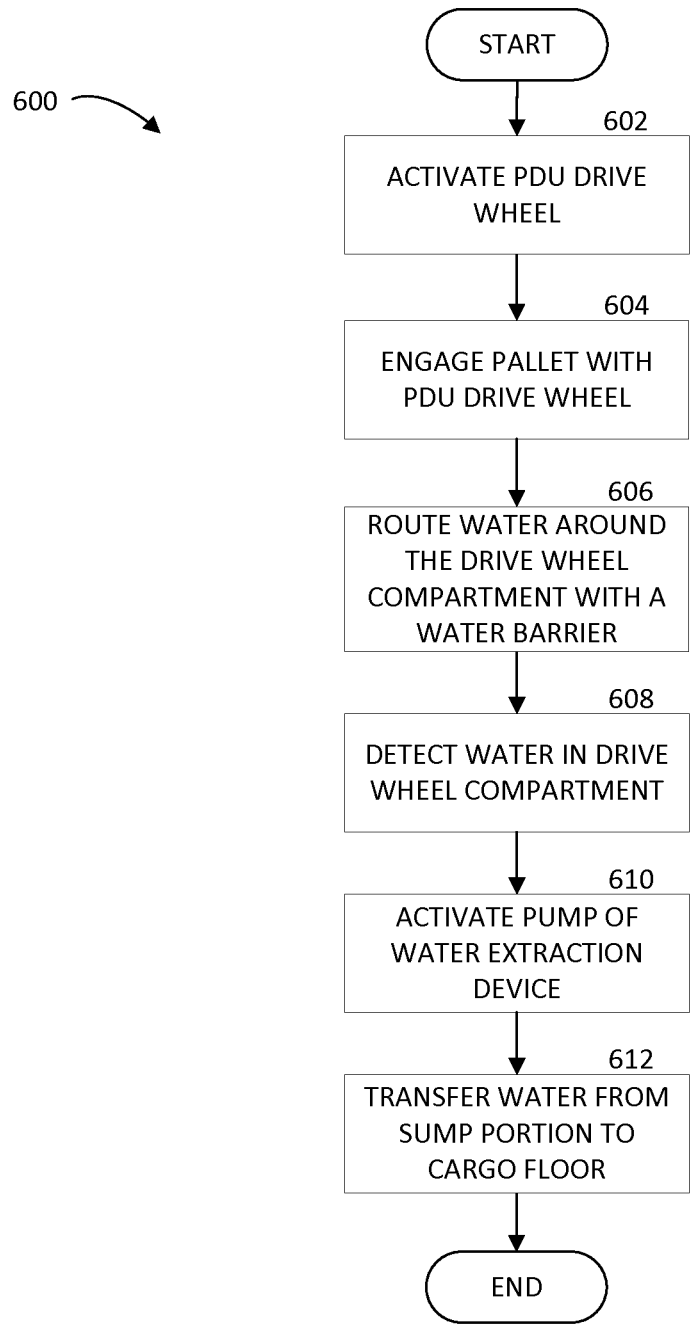
FIG. 6 is a flow diagram showing a method for moving pallets over a cargo floor in a wet environment according to various embodiments presented herein.

Turning now to FIG. 6, additional details will be provided regarding embodiments presented herein for moving pallets 102 over a cargo floor 108 while preventing water accumulation within the drive wheel compartment 114. It should be appreciated that more or fewer operations may be performed than shown in the figures and described herein. These operations may also be performed in parallel, or in a different order than those described herein.

FIG. 6 shows a routine 600 for moving pallets 102 over a cargo floor 108 in a wet environment. The routine 600 begins at operation 602, where the PDU drive wheel 116 is activated. When a pallet 102 contacts the PDU drive wheel 116 at operation 604, the pallet 102 is driven across the PDU 100. At operation 606, a water barrier 120 routes water around the drive wheel compartment 114. According to one embodiment, the water barrier 120 is positioned around the outer edge 202 of the PDU housing 112, as shown in FIGS. 1 and 2. Alternatively, the top portion 132 of the PDU housing 112 may include the outer edge 302 of the drive wheel compartment 114, as shown in FIGS. 3-5.

From operation 606, the routine 600 continues to operation 608, where water is detected in the drive wheel compartment 114. As described above, water may be detected in various ways, including via a water sensor 134. Water may be detected or may be detected at a current level, which may be compared to a threshold level. The detection of water, or water at a threshold level, may trigger the activation of a pump 124 of a water extraction mechanism 122 at operation 610. Alternatively, the pump 124 may be activated via a user input or a predetermined schedule. At operation 612, the water is transferred from the sump portion 128 or the drive wheel compartment 114 to the cargo floor 108 via the water conduit 126, and the routine 600 ends.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A power drive unit (PDU) for moving pallets over a cargo floor in a wet environment, comprising:
    a PDU housing configured for installation within the cargo floor;
    a PDU drive wheel positioned within a drive wheel compartment of the PDU housing and extending a height H1 above the cargo floor;
    a water barrier positioned around a top portion of the PDU housing and extending above the cargo floor a distance less than the height H1; and
    a water extraction mechanism configured to transfer water from a sump portion of the drive wheel compartment to the cargo floor outside of the water barrier.

2. The PDU of claim 1, wherein the PDU housing, the PDU drive wheel, the water barrier, and the water extraction mechanism are integrated into a single unit configured for removable installation into the cargo floor.

3. The PDU of claim 1, wherein the PDU housing and the PDU drive wheel are integrated into a PDU configured for removable installation within the cargo floor, and wherein the water barrier and the water extraction mechanism is configured for attachment to the PDU.

4. The PDU of claim 1, wherein the top portion of the PDU housing comprises a perimeter of the drive wheel compartment of the PDU housing such that the water barrier is positioned around the perimeter of the drive wheel compartment of the PDU housing.

5. The PDU of claim 1, wherein the top portion of the PDU housing comprises an outer edge of the PDU housing such that the water barrier is positioned around the outer edge of the PDU housing.

6. The PDU of claim 1, wherein the water extraction mechanism comprises a water conduit fluidly coupling the sump portion of the drive wheel compartment to an exterior side of the water barrier, and a pump fluidly coupled to the water conduit and operative to pump water from the sump portion of the housing through the water conduit to the cargo floor on the exterior side of the water barrier.

7. The PDU of claim 6, wherein the pump is operatively coupled to a water sensor such that the pump is activated upon detection of water within the sump portion of the drive wheel compartment.

8. The PDU of claim 7, wherein the pump is activated upon detection of water at a threshold depth within the sump portion of the drive wheel compartment.

9. The PDU of claim 6, further comprising a motor operatively coupled to the PDU drive wheel and configured to rotate the PDU drive wheel,
    wherein the pump is operatively coupled to the motor such that the pump is activated upon activation of the motor.

10. The PDU of claim 6, further comprising a motor operatively coupled to the PDU drive wheel and configured to rotate the PDU drive wheel,
    wherein the pump operates independently of the motor and is activated in response to a user input or to a predetermined schedule.

11. A method for moving pallets over a cargo floor in a wet environment, the method comprising:
    activating a PDU drive wheel within a drive wheel compartment of a PDU housing;
    engaging a bottom surface of a pallet with the PDU drive wheel to move the pallet;
    routing water around the drive wheel compartment with a water barrier positioned around a top portion of the PDU housing; and
    transferring water from a sump portion of the drive wheel compartment to the cargo floor outside of the water barrier via a water extraction mechanism.

12. The method of claim 11, wherein the top portion of the PDU housing comprises a perimeter of the drive wheel compartment of the PDU housing, and wherein the water barrier is positioned around the perimeter of the drive wheel compartment.

13. The method of claim 11, wherein the top portion of the PDU housing comprises an outer edge of the PDU housing, and wherein the water barrier is positioned around the outer edge of the PDU housing.

14. The method of claim 11, further comprising:
    detecting water within the sump portion of the drive wheel compartment with a water sensor; and
    in response to detecting the water within the sump portion of the drive wheel compartment, activating a pump of the water extraction mechanism, wherein transferring the water via the water extraction mechanism comprises pumping the water from the sump portion of the drive wheel compartment through a water conduit to the cargo floor outside of the water barrier.

15. The method of claim 11, further comprising:
    in response to activating the PDU drive wheel, activating a pump of the water extraction mechanism, wherein transferring the water via the water extraction mechanism comprises pumping the water from the sump portion of the drive wheel compartment through a water conduit to the cargo floor outside of the water barrier.

16. The method of claim 11, further comprising:
    activating a pump of the water extraction mechanism in response to a user input or to a predetermined schedule such that transferring the water via the water extraction mechanism comprises pumping the water from the sump portion of the drive wheel compartment through a water conduit to the cargo floor outside of the water barrier in response to the activation.

17. A PDU for moving pallets over a cargo floor in a wet environment, comprising:
    a PDU housing configured for removable installation within the cargo floor;
    a PDU drive wheel positioned within a drive wheel compartment of the PDU housing and extending a height H1 above the cargo floor;
    a motor positioned within the PDU housing, operatively coupled to the PDU drive wheel, and configured to rotate the PDU drive wheel;
    a water barrier positioned around a top portion of the PDU housing and extending above the cargo floor a distance less than the height H1;
    a water conduit positioned within the PDU housing and fluidly coupling a sump portion of the drive wheel compartment to an exterior side of the water barrier; and
    a pump positioned within the PDU housing, fluidly coupled to the water conduit, and operative to pump water from the sump portion of the housing through the water conduit to the cargo floor on the exterior side of the water barrier.

18. The PDU of claim 17, further comprising a water sensor positioned proximate to the sump portion of the drive wheel compartment, wherein the pump is operatively coupled to the water sensor such that the pump is activated upon detection of water within the sump portion of the drive wheel compartment.

19. The PDU of claim 17, wherein the pump is operatively coupled to the motor such that the pump is activated upon activation of the motor.

20. The PDU of claim 17, wherein the pump operates independently of the motor and is activated in response to a user input or to a predetermined schedule.

* * * * *